United States Patent
Ikeda

(10) Patent No.: US 10,544,903 B2
(45) Date of Patent: Jan. 28, 2020

(54) GAS PRESSURE FEED DEVICE

(71) Applicant: CHIYODA CORPORATION, Yokohama-shi (JP)

(72) Inventor: Takeshi Ikeda, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 58 days.

(21) Appl. No.: 15/559,965

(22) PCT Filed: Mar. 14, 2016

(86) PCT No.: PCT/JP2016/057922
§ 371 (c)(1),
(2) Date: Sep. 20, 2017

(87) PCT Pub. No.: WO2016/152609
PCT Pub. Date: Sep. 29, 2016

(65) Prior Publication Data
US 2018/0073684 A1 Mar. 15, 2018

(30) Foreign Application Priority Data
Mar. 24, 2015 (JP) .................. 2015-060775

(51) Int. Cl.
*F16K 11/087* (2006.01)
*F17D 1/04* (2006.01)
(Continued)

(52) U.S. Cl.
CPC .............. *F17D 1/04* (2013.01); *F16K 11/087* (2013.01); *F17C 13/04* (2013.01); *F17D 3/01* (2013.01)

(58) Field of Classification Search
None
See application file for complete search history.

(56) References Cited

U.S. PATENT DOCUMENTS

| 164,448 | A | * | 6/1875 | Hallett | .................. F16K 11/087 |
| | | | | | 137/625.41 |
| 759,688 | A | * | 5/1904 | Frazier | .................... B60B 39/02 |
| | | | | | 137/625.47 |

(Continued)

FOREIGN PATENT DOCUMENTS

| JP | S52131223 A | 11/1977 |
| JP | H09170592 A | 6/1997 |

(Continued)

OTHER PUBLICATIONS

PCT International Search Report, PCT/JP2016/057922, dated Jun. 14, 2016, 3 pages.

(Continued)

*Primary Examiner* — John Fox
(74) *Attorney, Agent, or Firm* — Quarles & Brady LLP

(57) ABSTRACT

Provided is a gas pressure feed device including a compression device for compressing gas supplied from the upstream process and sending the gas to the downstream process, a shut off device provided in the downstream further than the compression device for shutting off the gas heading toward the downstream process, and a recirculation device for recirculate the gas shut off by the shut off device to the upstream of the compression device. The shut off device includes a first port on a primary side for introducing the gas from the compression device, a second port on a secondary side for sending the gas to the downstream process, a third port on the secondary side for sending the gas to the recirculation device, and a switching device for switching the gas heading toward the secondary side to either the second port or the third port.

6 Claims, 7 Drawing Sheets

(51) Int. Cl.
  *F17C 13/04*   (2006.01)
  *F17D 3/01*    (2006.01)

(56) References Cited

U.S. PATENT DOCUMENTS

| | | | | | |
|---|---|---|---|---|---|
| 1,807,085 | A | * | 5/1931 | Crickmer | F16K 11/0853 137/625.47 |
| 1,807,900 | A | * | 6/1931 | Dougherty | E03C 1/052 137/597 |
| 2,393,464 | A | * | 1/1946 | Granberg | B67D 7/3272 137/551 |
| 3,817,265 | A | * | 6/1974 | Ambler | F04B 49/022 137/115.25 |
| 5,251,663 | A | * | 10/1993 | Christianson | F16K 11/0853 137/625.47 |
| 9,404,241 | B1 | * | 8/2016 | Davantes | E03B 1/044 |

FOREIGN PATENT DOCUMENTS

| | | |
|---|---|---|
| JP | H11210991 A | 8/1999 |
| JP | 2014181629 A | 9/2014 |

OTHER PUBLICATIONS

PCT International Preliminary Report on Patentability, PCT/JP2016/057922, dated Oct. 5, 2017, 12 pages.

* cited by examiner

Prior Art

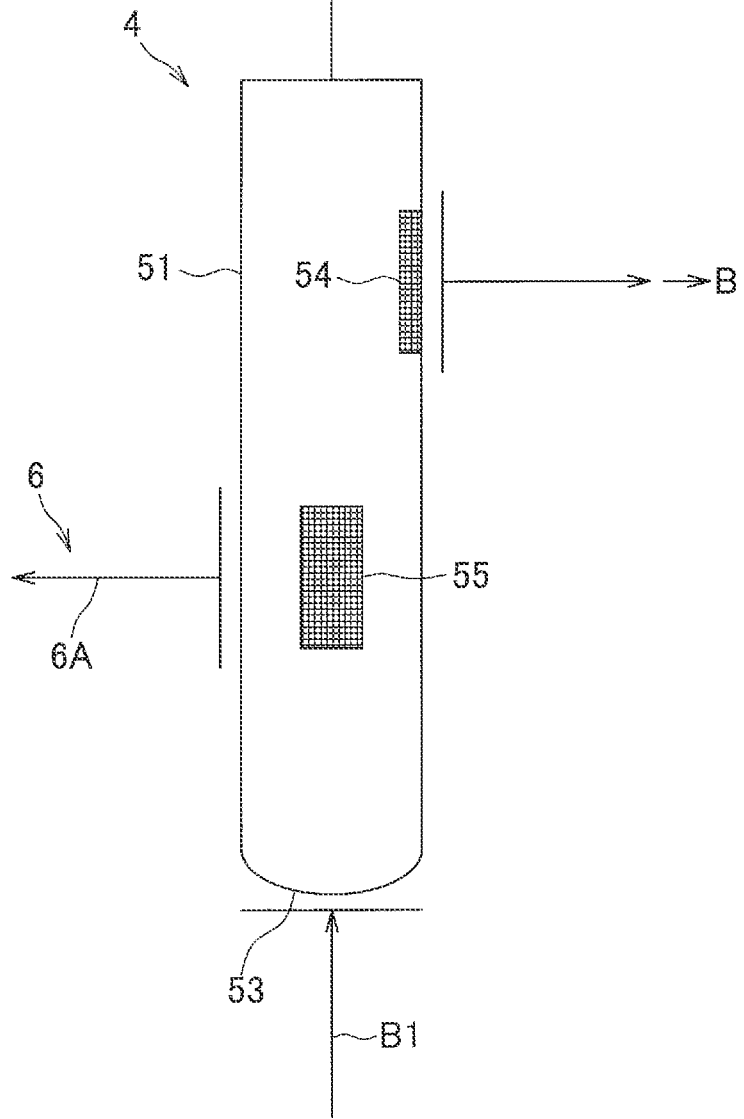

GAS PRESSURE FEED DEVICE

CROSS-REFERENCE TO RELATED APPLICATIONS

This application represents the national stage entry of PCT International Application No. PCT/JP2016/057922 filed Mar. 14, 2016 and claims priority to Japanese Patent Application No. 2015-060775 filed Mar. 24, 2015. The contents of these applications are hereby incorporated by reference as if set forth in their entirety herein.

TECHNICAL FIELD

The present invention relates to a gas pressure feed device compressing various gases supplied from the upstream process with a compressor or the like and sending the gases to the downstream process.

BACKGROUND ART

Conventionally, for example, in manufacturing facilities, storage facilities and receiving facilities producing liquefied gas (liquefied natural gas (LNG), liquefied petroleum gas (LPG), etc.), various gases such as raw material gas, refrigerant gas, boil-off gas, supply gas, etc. are pressurized to appropriate pressure levels from low pressure to pressure and then transferred using various pipe paths. In order to prevent device breakage due to excessive rise in gas pressure in system, such method is used of transferring the gas to a flare facility by relieving from pressure safety valves installed on to the paths, and burning the gas to discard in the flare facility (for example, refer to Patent Document 1).

In the liquefied gas storage facility described in Patent Document 1, liquefied gas stored in a liquefied gas storage tank is pumped to a vaporizer, the liquefied gas is heated by the vaporizer to be vaporized. The vaporized gas is sent to a vaporized gas supply line to a demand side gas line. A liquefied gas removal line is provided with first shut off valve, and on the downstream side of the first shut off valve a liquefied gas return line returning the liquefied gas to the liquefied gas storage tank is connected, and the liquefied gas return line is provided with second shut off valve. The vaporized gas supply line is provided in order from the upstream side with a safety valve, a demand side shut off valve, and a stack shut off valve, and a flare stack is connected to the stack shut off valve via a stack line.

In this facility, during normal operation, the first shut off valve and the demand side shut off valve are released, and the safety valve, the stack shut off valve and the second shut off valve are closed, and for example, if the demand side gas line is suffered by an abnormality, the first shut off valve and the demand side shut off valve are shut off, the pump stops, and the stack shut off valve and the second shut off valve are released. Also, releasing the safety valve prevents the equipment from being damaged due to an excessive rise in pressure in the vaporized gas supply line. Further, returning the vaporized gas to the liquefied gas storage tank via the liquefied gas return line reduces the amount of releasing the vaporized gas in the line from the safety valve and the amount of vaporized gas to be processed with the flare stack.

CITATION LIST

Patent Document

Patent Document 1: Japanese Unexamined Patent Publication No. 11-210991

SUMMARY OF THE INVENTION

Technical Problem

However, in the conventional system described in Patent Document 1, it is necessary to shut off the two shut off valves and then open the normally closed stack shut off valve and the second shut off valve when the gas pressure in the line rises. Therefore, multiple devices are to be operated simultaneously or sequentially in an appropriate manner, these make complicated its control and requiring a large number of auxiliary mechanism to operate a plurality of devices, which poses a problem that the system configuration becomes complicated and too large.

One of the Object of the present invention is to provide a gas pressure feed device capable of appropriately suppressing an increase in the gas pressure in the system without too high complication of the control or the configuration of the system making the system too far enormous.

Solution to Problem

A gas pressure feed device of the present invention includes a compression device for compressing the gas supplied from the upstream process and sending the gas to the downstream process; a shut off device provided at the downstream side of the compression device for shutting off the gas heading toward the downstream process; and the recirculation device for recirculating the gas shut off by the shut off device to the upstream side of the compression device, wherein the shut off device includes a first port on a primary side for introducing the gas from the compression device, a second port on a secondary side for sending the gas to the downstream process, a third port on the secondary side for sending the gas to the recirculation device, and a switching device for switching the gas heading toward the secondary side to either the second port or the third port.

According to the present invention as described above, the shut off device includes the first port, the second port, the third port, and the switching device, and during normal operation, the gas is released from the secondary port toward the downstream process, and in the emergency, the switching device switches the direction of the gas from the second port to the third port, the gas to the second port to the downstream process is shut off and is diverted to the third port toward the circulation device, allowing the gas to recirculate to the upstream of the compression device. As such, easy operation in switching among the secondary ports from the second port to the third port in the shut off device enables suppression of rise in the gas pressure in the downstream of the compression device. Furthermore, the need of such conventional complicated control is eliminated that a plurality of shut off valves is operated simultaneously or in an adequate order, as well as a plurality of shut off valves and the like and auxiliary machines accompanying them can be omitted, and it is therefore possible to simplify system structure so as to reduce the size of the equipment items and reduce factors related to the system failure.

In this case, in the gas pressure feed device of the present invention, the shut off device is preferred to keep the gas heading for at least one of the secondary port and the third port in an intermediate position of the switch by the switching device.

According to this configuration, in the middle position where the secondary port of the shut off device is switched from the second port to the third port, the gas flow is kept to head for at least one of the second port and the third port, and therefore the gas circulation is never stopped completely, and gas pressure rise during such switching operation cannot be encompassed.

In the gas pressure feed device of the present invention, the shut off device comprises a three-way like valve having a case-shaped valve main framework, a valve port ("ball port") in which the secondary side thereof is having a range of motion and supported between positions of the second port and the third port, and a driving device for driving the valve port ("ball port"), wherein the valve main framework is provided with the first port, the second port, and the third port, wherein the switching device is constituted by the valve port ("ball port") and the driving device, wherein the valve port ("ball port") is provided with a first communication portion transmittable with the first port, a second communication portion transmittable with at least one of the second port and the third port, and a gas flow portion for allowing gas to flow from the first communication portion to the second communication portion, and wherein movement of the valve port ("ball port") by the driving device preferably switches between a first position in which the first communication portion transports with the first port and the second communication portion transports with the second port and a second position in which the first communication portion transports with the first port and the second communication portion transportable with the third port.

According to this configuration, since the shut off device is constituted by the three-way like valve having the valve main framework, the valve port ("ball port") and the driving device, the movement of the valve port ("ball port") by the driving device switches between the first position in which the first communication portion transports with the first port and the second communication portion transports with the second port and the second position in which the first communication portion transports with the first port and the second communication portion transports with the third port, it is possible to securely implement the switching operation and improve reliability of the operation.

Further, in the gas pressure feed device of the present invention, the valve port ("ball port") is formed in a spherical shape and is rotationally supported in the valve main framework such that the secondary side thereof is located between the positions of the second port and the third port, wherein the first communication portion and the second communication portion are positioned oppositely in a radial direction of the valve framework, and the gas flow portion is formed through the valve port ("ball port"), wherein the first communication portion has a first opening area enveloping the first port in a movement range caused by rotation of the valve port ("ball port"), and wherein the second communication portion is configured such that a first flow passage cross section at the second port and the third port in the intermediate position between the first position and the second position caused by the rotation of the valve port ("ball port") has a second opening area more than a half of the first flow passage cross section at the first communication port.

According to this configuration, since the first communication portion of the spherically-formed valve port ("ball port") has the first opening area enveloping the first communication port in its movable range, and the second communication portion is configured to have the second opening area more than a half of the first flow passage cross section at the first communication port in the intermediate stage between the first position and the second position, the gas circulation is not completely blocked, throughout in switching operations, the gas flow passage area of at least more than half of that in the normal operation can be secured, and the rise in gas pressure during switching can be kept minimized.

Also, according to the gas pressure feed device of the present invention as described above, the shut off device preferably comprises a first two-way valve provided in the gas transfer route of the compression device directed to the downstream process, a second two-way valve provided in the gas transfer route of the compression device directed to the recirculation device, and a driving device for driving the first two-way valve and the second two-way valve, and wherein the driving device constituting the switching device switches between a first position in which the gas is sent from the second port to the downstream process by opening the first two-way valve and closing the second two-way valve and a second position in which the gas is recirculated from the third port to the recirculation device by closing the first two-way valve and opening the second two-way valve.

According to this configuration, since the shut off device preferably comprises the first two-way valve and the second two-way valve, and the driving device switches between the first position and the second position, it is possible to adequately suppress the rise in the gas pressure without inducing complication or making the system too far enormous.

Also, according to the gas pressure feed device of the present invention, the shut off device comprises a tubular valve framework and a driving device for rotationally driving the valve port ("inner port") axially, wherein the valve framework is provided with the first communication port at one side in an axial direction, and the second communication port at a predetermined orientation on a cylindrical surface, and the third communication port at a position on cylindrical surface deviated from the second port, and wherein moving in a circumferential direction of the valve framework by the driving device constituting the switching device switches between a first position in which the gas is sent from the second port to the downstream process and a second position in which the gas is recirculated from the third port to the recirculation device.

According to this configuration, since the shut off device comprises the tubular valve framework and moving in a circumferential direction of the valve port ("inner port") by the driving device switches between the first position and the second position, it is possible to improve reliability by implementing switching operation securely.

Advantageous Effects of Invention

According to such gas pressure feed device of the present invention as described above, it is possible to adequately suppress the rise in the gas pressure in the system without inducing complexity of the control, and complexity and making the system too far enormous.

BRIEF DESCRIPTION OF DRAWINGS

FIG. 8(A) is a schematic configuration diagram showing the shut off device according to another modification of the present invention; and FIG. 8(B) is a schematic configuration diagram showing the shut off device according to another modification of the present invention.

DESCRIPTION OF EMBODIMENTS

Hereinafter, embodiments of the present invention will be described with reference to the drawings. The gas pressure feed device 1 of the present embodiment is, for example, installed in manufacturing facilities, storage facilities, receiving facilities, etc. for liquefied natural gas (LNG), and is intended to pressuredly-feed gas from the upper process to the downstream process. Here, as the gas that is subject to be pressuredly-fed, such various gases are exemplified as natural gas that is raw material gas, refrigerant gas for cooling natural gas, boil-off gas generated by natural gas being vaporized, supply gas for sending to the utilization system.

Figure 1:
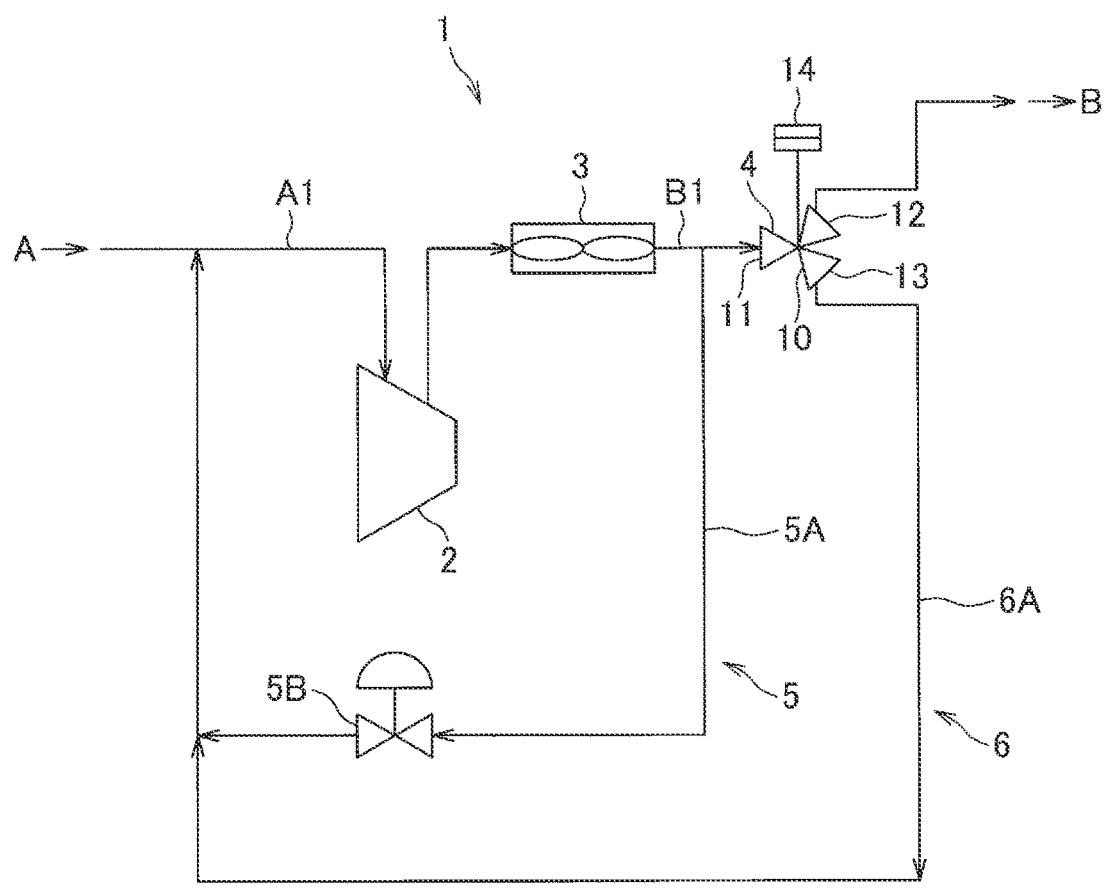
FIG. 1 is a schematic configuration diagram showing a gas pressure feed device according to an embodiment of the present invention.

As shown in FIG. 1, the gas pressure feed device 1 is connected with a gas supply line A for supplying gas from an upstream process and a gas sending line B for sending compressed gas to the downstream process. Here, as the upstream process or the downstream process, various types are present corresponding to the type of the target gas and the position in the facility, and as an example, when the target gas is the supply gas, the upstream process is vaporization process, and the downstream process is the sending process to the facility consuming the gas.

Figure 5:
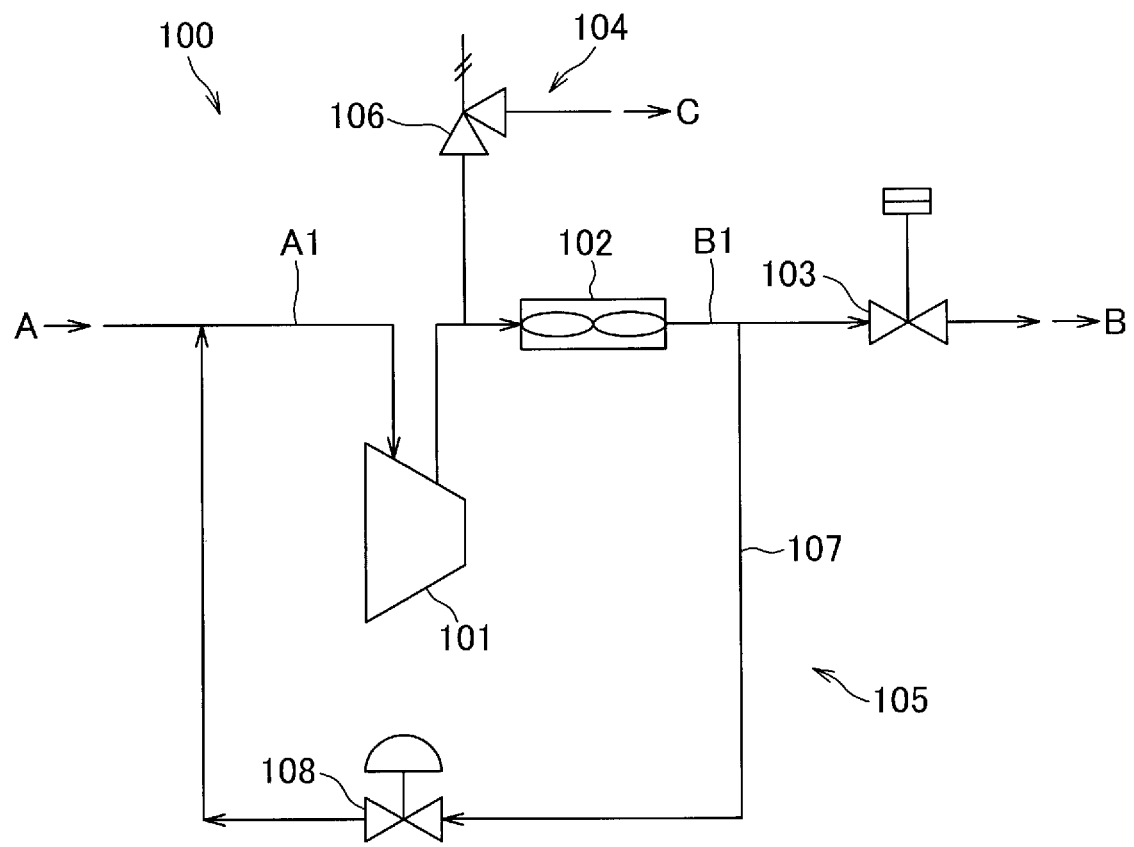
FIG. 5 is a schematic configuration diagram showing a gas pressure feed device before improvement according to the present invention.

Here, instead of the gas pressure feed device 100 of the present embodiment, a before-improvement gas pressure feed device 100 will be described with reference to FIG. 5. Similar to the gas pressure feed device 1, the gas pressure feed device 100 is connected with the gas supply line A and the gas sending line B. This gas pressure feed device 100 is provided with a gas compression device 101 for compressing the gas supplied from the supply line A, a cooling device 102 for cooling the gas compressed by the gas compression device, a shut off device 103 for shutting off sending the gas cooled by the cooling device 102 to the downstream process, a release device 104 for releasing the gas connected between the compression device 101 and the cooling device 102, and a surge prevention device 105 connected to the upstream side of the device 101 from between the cooling device 102 and the shut off device 103.

The compression device 101 is the one compressing the gas supplied through the upstream pipe A1 from the upstream process and sending the compressed gas to the downstream process through the downstream pipe B1, and for example, a centrifugal compressor is used. The cooling device 102 is the one provided in the middle of the downstream pipe B1, and cooling the gas boosted and heated by the compression device 101, and for example, an air-cooled type air fin cooler is used.

The shut off device 103 is what is provided on the downstream side of the cooling device 102 in the downstream pipe B1, and shutting off sending of the gas to the downstream process, and for example a gas shut off valve is used. This gas shut off valve is driven and controlled by not-shown control device, and is released in normal operation, and is designed to be closed in emergency.

The release device 104 is arranged such that when the shut off device 103 shuts off sending of the gas to the downstream process until the compression device 101 stops, the gas is released to the atmosphere in order to suppress the gas pressure inside the downstream pipe B1 from rising. The release device 104 has a safety valve 106 which opens when the gas pressure exceeds a predetermined value, and to the secondary side of the safety valve 106 is connected a flare stack C for burning the gas and releasing it to the atmosphere.

The surge prevention device 105 is the one preventing the surge state occurring in the compression device 101 from adversely affecting the compression device 101 caused by variation of the gas pressure at the start and stop of operation of the compression device 101 and difference in the gas pressure based on the gas demand amount in the downstream process, etc. This surge prevention device 105 is configured to include a recirculation pipe 107 connected from between the cooling device 102 and the shut off device 103 in the downstream pipe B1 to the upstream pipe A1 on the upstream side of the compression device 101, and an anti-surge valve 108 which is provided in the middle of the circulation pipe 107 to prevent the surge state of the compression device 101.

As described above, according to the before-improvement gas pressure feed device 100, in the emergency where abnormality of the downstream process (for example, fire, etc.) is detected and the shut off device 103 is operated, whereby sending of the gas to the downstream process is interrupted, when the internal gas pressure rises until the operation of the compression device 101 is stopped, the safety valve 106 of the release device 104 opens so as to release the gas via the flare stack C into the atmosphere, which prevents excessive increase of the gas pressure in the downstream pipe B1.

However, in the before-improvement gas pressure feed device 100, because timing delay is induced from stopping the gas of the downstream line B1 by the shut off device 103 until the safety valve 106 of the release device 104 is opened, the gas pressure in the downstream pipe B1 rises. Also, since the safety valve 106 and the flare stack C surely operate in order to ensure safety of the system, it is necessary to ensure the certainty of the operation in a plurality of machines such as the shut off device 103, the safety valve 106 and the flare stack C. For this reason, there is a problem of requiring a great deal of labor in such as the case of support and maintenance of each of equipment item. Further, there is also a problem in the before-improvement gas pressure feed device 100 that the load on the environment increases because the gas burned at the flare stack C is released into the atmosphere during an emergency.

Compared with the pressured gas feed device that is prior to improvement 100 as described above, improvements in the gas pressure feed device 1 of the present embodiment will be described in detail below with reference to FIGS. 1 to 4(C). The gas pressure feed device 1 includes a compression device 2, a cooling device 3, a shut off device 4, a surge prevention device 5 and a recirculation device 6. In this gas pressure feed device 1, a shut off device 4 and the recirculation device 6 are improved from the device 100. On the other hand, as the compression device 2, the cooling device 3 and the surge prevention device 5 are used substantially similar to the compression device 101, the cooling device 102 and the surge prevention device 105.

The shut off device 4 comprises a three-way valve 10 including a first port 11 on the primary side for introducing gas from the compression device 2, a second port 12 on the secondary side for sending gas toward downstream process, and a third port 13 for releasing gas toward the recirculation device 6, and a switching device 14 for switching gas to be sent to the secondary side to either one of the second port 12 and the third port 13.

Figure 2:
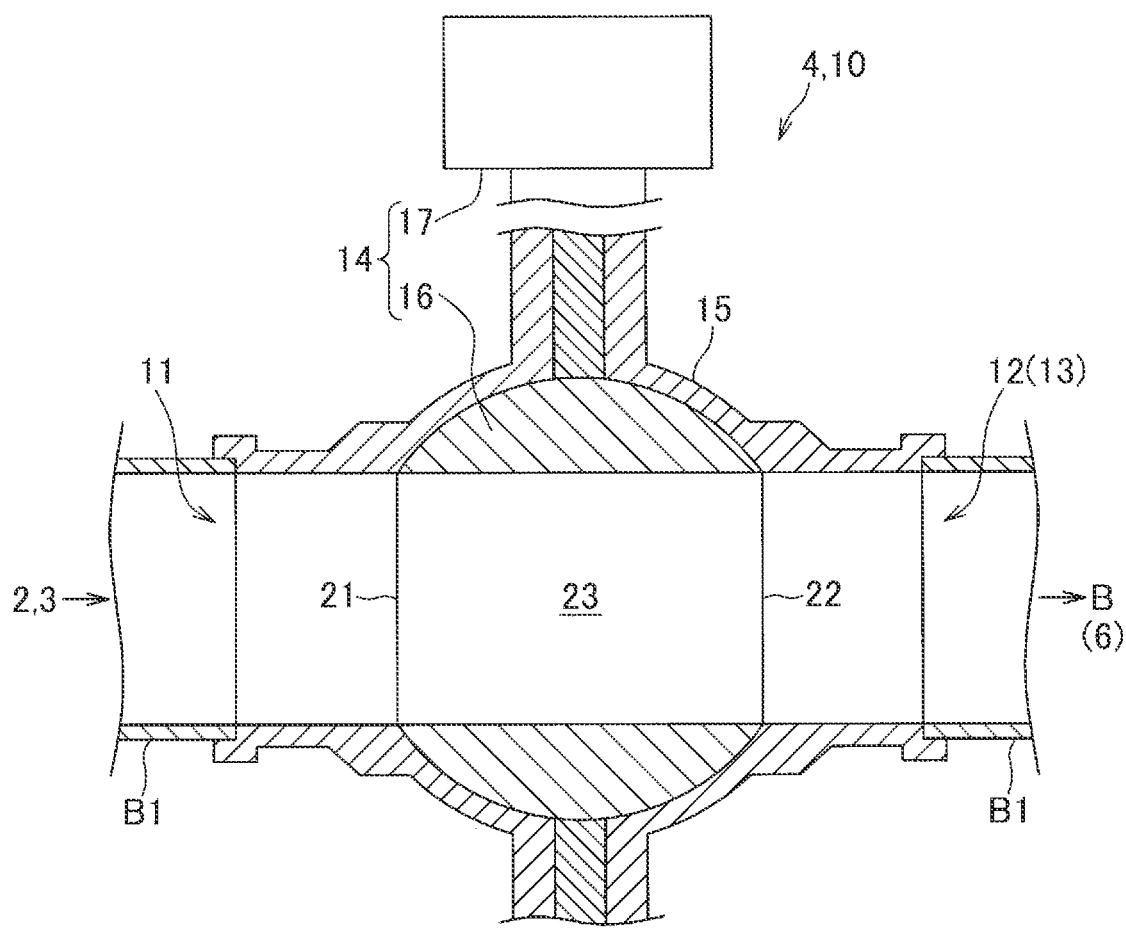
FIG. 2 is a cross-sectional view showing the shut off device in the gas pressure feed device.
Figure 3A:
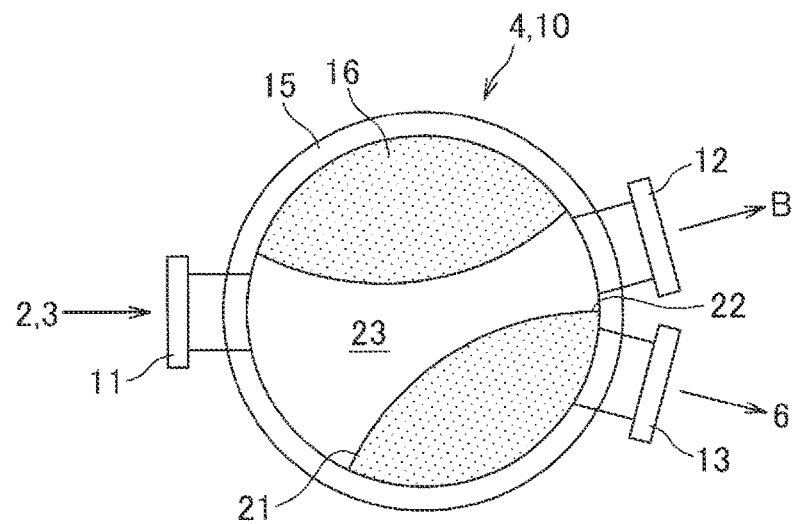
FIG. 3(A) is a cross-sectional view for explaining a switching operation of the shut off device.
Figure 3B:
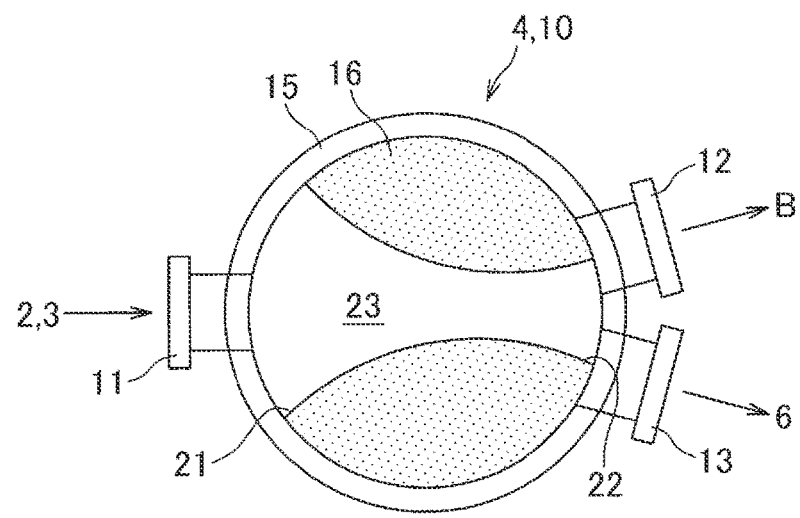
FIG. 3(B) is a cross-sectional view for explaining a switching operation of the shut off device.
Figure 3C:
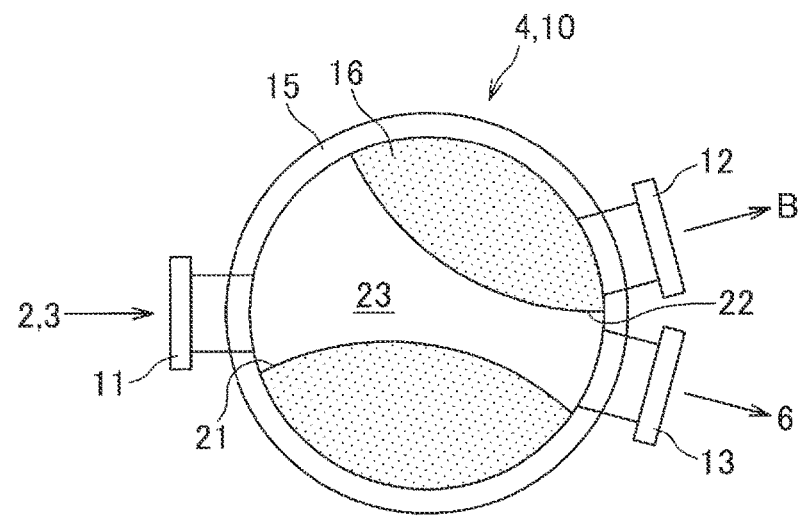
FIG. 3(C) is a cross-sectional view for explaining a switching operation of the shut off device.

As shown in FIGS. 2 and 3(C), the three-way valve 10 is constituted by a ball valve having a case-shaped valve main framework 15, a spherical valve element 16 in which the secondary side is rotationally supported between a position of the second port 12 and a position of the third port 13 inside of the valve main framework 15, an actuator 17 as a driving device for driving the valve element 16 to rotate. The valve port ("inner port") 16 and the actuator 17 constitute the switching device 14, and the actuator 17 is driven and controlled by a not-shown control device. Further, the valve main framework 15 is provided with a first port 11, a second port 12, and a third port 13, and each of these ports 11, 12, 13 is substantially cylindrical and has substantially the same opening area.

The valve port ("ball port") 16 includes a first communication portion 21 transferable with the first port 11, a second communication portion 22 transferable with any one of the second port 12 and the three port 13, and a gas flow portion 23 for allowing gas to flow from the first communication portion 21 through the gas communication portion 22. The first communication portion 21 and the second communication portion 22 are positioned on the opposite side in the radial direction of the valve port ("inner port") 16 from each other, and the gas flow portion 23 is formed through the valve port ("inner port") 16. Such valve port ("inner port") 16 is made switchable by rotation of the valve port ("inner port") 16 by actuated by the actuator 17 between a first position in which the communication portion 22 is communicated with the second port 12 as shown in FIG. 3(A), and a second position in which the second communication portion 22 is communicated with the third port 13 as shown in FIG. 3(C).

The first communication portion 21 is formed in a long elliptical shape or an oval shape along the rotating direction of the valve port ("inner port") 16, and the size of the opening area is formed in such size as to envelop the first port 11 in the range of movement accompanied by the rotation of the valve port ("inner port") 16. The gas flow portion 23 is formed such that its diameter is gradually reduced from the first communication portion 21, but the cross section of the flow passage at the position having the minimum inside diameter at the middle is made equal to or greater than the opening area of the first port 11. Referring to FIG. 3, the gas flow portion 23 decreases in diameter from the first communication portion 21 to a middle position and the cross sectional area of a flow passage at the middle position is equal to or more than an opening area of a flow passage at the first port 11, and the gas flow passage increases in diameter from the middle position toward the second communication portion 22. The change in diameter is continuous and smooth from the first communication portion 21 to the second communication portion 22.

Figure 4A:
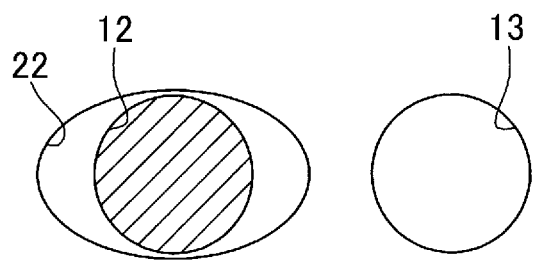
FIG. 4(A) is a diagram for explaining the switching operation on the secondary side of the shut off device.
Figure 4B:
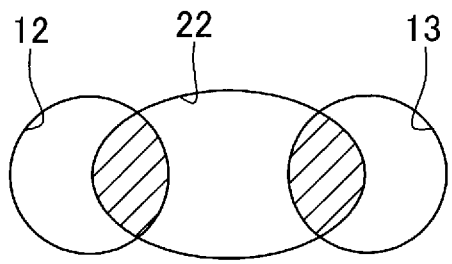
FIG. 4(B) is a diagram for explaining the switching operation on the secondary side of the shut off device.
Figure 4C:
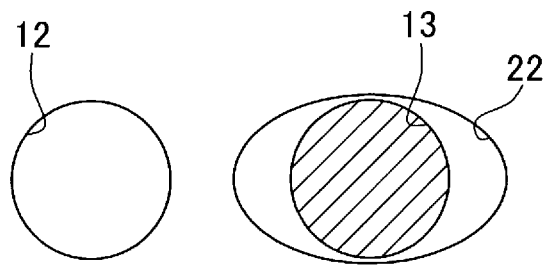
FIG. 4(C) is a diagram for explaining the switching operation on the secondary side of the shut off device.

As shown in FIGS. 4(A), 4(B), and 4(C), the second communication portion 22 is formed in a long elliptical shape along the rotation direction of the valve element 16, and in the first position shown in FIG. 4(A), is in communication with the second port 12, and in the second position shown in FIG. 4(C), is in communication with the third port 13. Further, the opening area of the second opening 22 is made such that the opening area of the second port 12 and the third port 13 (indicated by hatching in the drawing) in the course of switching between the first position and the second position shown in FIG. 4(B) is more than half of the sectional area on the side of the first port 11 (opening area of the first port 11). That is, the second communication portion 22 is configured so as not to be shut off even in the middle of switching between the first position and the second position, and to necessarily communicate with at least one of the second port 12 and the third port 13.

Like the surge prevention device 105, the surge prevention device 5 includes a circulation pipe 5A to be connected to the upstream pipe A1 on the upstream side of the compression device 2 from between the cooling device 3 and the shut off device 4, an anti-surge valve 5B provided in the middle of the circulation pipe 5A for preventing the surge condition inside the compression device 2. The recirculation device 6 is connected to the third port 13 of the shut off device 4, as well as includes a recirculation pipe 6A to be connected to the secondary side of the anti-surge valve 5B in the circulating pipe 5A of the surge prevention device 5. This recirculation device 6 receives in the return pipe 6A the gas in the downstream pipe B1 when the shut off device 4 is switched to the second position, and recirculates the gas to the upstream pipe A1 on the upstream side of the compression device 2 via the circulation pipe 5A of the surge prevention device 5.

In the above gas pressure feed device 1, during normal operation, as shown in FIGS. 3(A) and 4(A), the valve port ("inner port") 16 of the shut off device 4 transports with the first communication portion 21 through the first port 11, and becomes a first position in which the second communication portion 22 transports with the second port 12, and the gas can flow toward the second port 12 from the first port 11. Therefore, gas supplied from the upstream process through the gas supply line A by the compression device 2 will be sent to the downstream process through gas sending line B via the downstream pipe B1 and the shut off device 4.

On the other hand, in emergency, the actuator 17 of the shut off device 4 is driven by the control device, the valve port ("inner port") 16 is rotated, and as shown in FIGS. 3(C) and 4(C), when the state is brought into the second position that the second communication portion 22 transports with the third port 13, sending gas to the downstream process is interrupted. In this case, the gas reaching the shut off device 4 is sent from the third port 13 to the recirculation pipe 6A of the recirculation device 6, and returns to the upstream pipe A1 on the upstream side of the compression device 2 via the recirculation pipe 5A.

In this way, during switching to switch the valve port ("inner port") 16 of the shut off device 4 from the first position to the second position, as shown in FIGS. 3(B) and 4(B), the state becomes the one that the second communication portion 22 is laid across the second port 12 and the third port 13, and in this position, the gas flows from the first port 11 toward both the second port 12 and the third port 13. In other words, it is configured that the gas continues to be sent to at least any one of the second port 12 and the third port 13 without fully closing the second communication portion 22 even during switching. Such during switching, the flow of the circulated gas is secured by the flow pass area more than half of the first position and the second position.

According to the gas pressure feed device 1 of the present embodiment as described above, the following effects are obtained. That is, in the event of emergency, since the switching device 4 is switched to the second position, the gas is shut off from the second port 12 to the downstream process, and the gas can be sent from the third port 13 toward the recirculation device 6, easy operation that the valve port ("inner port") 16 is rotated by the actuator 17 in the shut off device 4 can suppress the rise in the gas pressure in the downstream pipe B1. Also, since a complicated control that operates multiple shut off valves at the same time or in an appropriate order becomes unnecessary and a plurality of shut off valves, etc. and auxiliary machines accompanied can be omitted, the system configuration becomes simplified, the size of the device becomes reduced, and the reliability of the system becomes improved. In addition, since the equipment configuration can be simplified and downsized, labor and cost for support and maintenance can be reduced.

Further, in the stage of switching, since the shut off device 4 from the first position to the second position, the gas continues to be sent to at least one of the first port 12 and the third port 13, the gas circulation does not completely stop, and the increase in the gas pressure during switching can be suppressed. Further, even during switching, since the flow rate of the circulated gas is secured to become more than half of the first position and the second position, the rise of the gas pressure can be kept to the minimum and the adverse influence on the compression device 2 is prevented. Further, since the shut off device 4 is constituted by the three-way valve 10, and the rotation of the valve port ("ball port") 16 by the actuator 17 can switch between the first position and the second position, the switching work is certainly performed, improving the reliability of the operation.

Also, in emergency, since recirculation of the gas from the third port 13 of the shut off device 4 toward the recirculation device 6 eliminates provision of the release device 104 like the before-improvement gas pressure feed device 100, the device configuration can be further simplified. Also, unnecessity to release gas to the atmosphere can reduce the environmental impact to the outside. Furthermore, omission of the release device 104 can reduce the foot print of the facility.

It should be noted that the present invention is not limited to the above-described embodiment, and includes other configuration in which the object of the present invention can be achieved, the following modifications and the like are also included in the present invention. Although the gas pressure feed device in the vaporized gas supply line installed in manufacturing facilities for liquefied natural gas (LNG), storage facilities, receiving facilities, etc., for example, has been described, the present invention is not limited to liquefied natural gas, and can be used as the gas pressure feed device in production facilities for liquefied petroleum gas (LPG), liquefied nitrogen, liquefied oxygen, liquid hydrogen and any liquefied gas. Also, the gas pressure feed device is not limited to the supply line, and may be used for gas transport line when gas is accepted into each facility, as well as for boil-off gas (BOG) process line for processing BOG generated by vaporization of LNG in the LNG storage tank. Also, in liquefied natural gas production facilities, it may be used in circulation system of various refrigerant gas used for liquefying natural gas.

Further, in the above-described embodiment, though the shut off device 4 is configured to include the three-way valve 10, the shut off device in the present invention is not limited to the three-way valve 10 described in the above embodiment, and can be replaced with an equipment item having the same function. Further, the three-way valve is not limited to a ball valve like the above-described embodiment, a columnar or disk-shaped valve port ("ball port") may be rotationally provided, or the valve port ("ball port") in an appropriate shape may be slidably provided. Further, the number of the valve elements is not limited to one, and a separate valve port ("ball port") may be provided for each of the first port, the second port, and the third port. Also, in the above embodiment, though the recirculation pipe 6A of the recirculation device 6 is connected with the circulation pipe 5A of the surge prevention device 5, it may be connected to the upstream piping A1 on the upstream side of the compression device 2.

Figure 6:
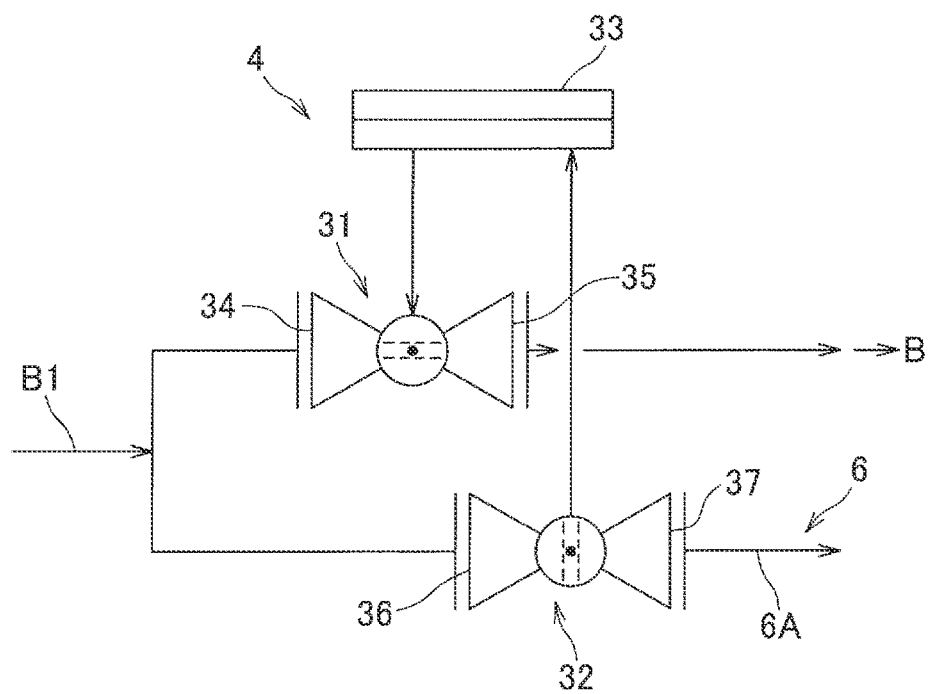
FIG. 6 is a schematic configuration diagram showing the shut off device according to one modification of the present invention.
Figure 7:
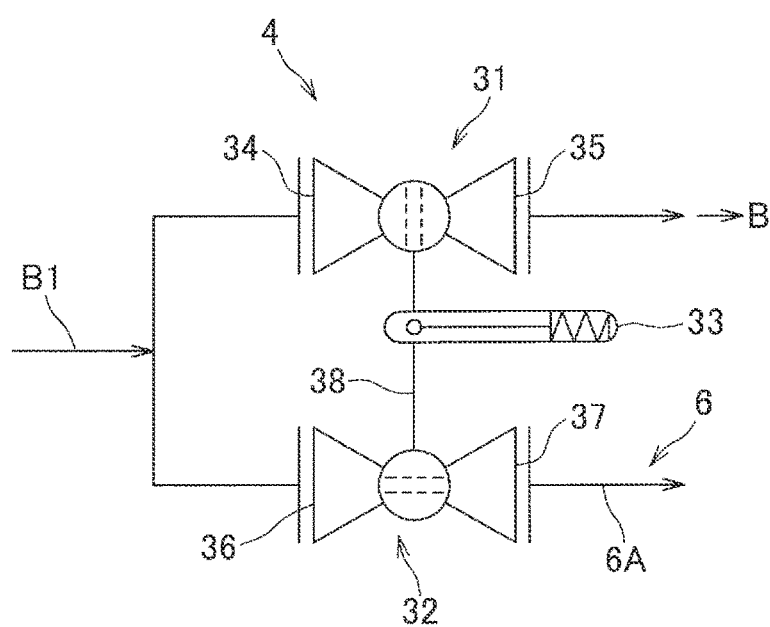
FIG. 7 is a schematic configuration diagram showing the shut off device according to another modification of the present invention.

Modifications of such shut off device 4 are described with reference to FIGS. 6 to 8(B). The shut off device 4 shown in FIGS. 6 and 7 is configured to include a first two-way valve 31, a second two-way valve 32, and an actuator 33 that is a driving device (switching device) for driving these first two-way valve 31 and second two-way valve 32. The first two-way valve 31 is provided with a first port 34 connected to downstream pipe B1 from the compression device 2, and the second two-way valve 35 to which the gas sending line B heading for downstream process is connected. The second two-way valve 32 is provided with the first port 36 to which the downstream pipe B1 from the compression device 2 is connected, and the third port 37 to which the recirculation pipe 6A of the recirculation device 6 is connected. The first two-way valve 31 and the second two-way valve 32 may each be ball valve having a spheroidal shape, or butterfly valve having rotating valve, allowing for switching of opening and closing by the drive of the actuator 33.

The actuator 33 shown in FIG. 6 is provided with a mechanical link structure arranged therein, that drives at the same time opening and closing of the valves of the first two-way valve 31 and the second two-way valve 32. The actuator 33 shown in FIG. 7 is connected to a stem 38 coupling the first two-way valve 31 and the second two-way valve 32, and drives at the same time opening and closing of the first two-way valve 31 and the second two-way valve 32. Furthermore, the actuator 33 shown in FIG. 7 includes a biasing device such as a spring arranged therein, and is configured to drive the stem 38 by the biasing force thereof.

In the shut off device 4 shown in FIGS. 6 and 7, in normal operation, opening the first two-way valve 31 and closing the second two-way valve 32 by the actuator allows the gas sent from the compression device 2 via the downstream pipe B1 to be sent to the downstream process from the first two-way valve 31 via the gas sending line B (first position). On the other hand, in emergency, closing the first two-way valve 31 and opening the second two-way valve 32 by the actuator 33 allows the gas sent from the compression device 2 via the downstream pipe B1 to recirculate from the two-way valve 32 via the recirculation device 6A to the recirculation device 6 (second position). Namely, driving of the actuator 33 switches the state between the first position and the second position. Note that the actuator 33 shown in FIG. 7 biases the valve bodies of the first two-way valve 31 and the second two-way valve 32 in the second position by the biasing force of the biasing device, and therefore even in the case in which driving force is lost it is configured to recirculate the gas to the recirculation device 6.

The shut off device 4 shown in FIGS. 8(A) and 8(B) is configured to be provided with a tubular (cylinder typed) valve port ("ball port") 51, and an actuator 52 that is a driving device (switching device) rotationally driving the valve port ("ball port") 51 axially. The valve port ("ball port") 51 is provided with a first port 53 on the first side in an axial direction (downward direction in FIGS. 8(A) and 8(B)), a second port 54 at a certain position in a circumferential direction, and a third port 55 at a position displaced from the second port 54 in the circumferential and axial directions. Rotational driving of the valve port ("ball port") 51 by the actuator 52 switches between a first position in which the gas is sent from the second port 54 via the gas sending line B to the downstream process, and a second position in which the gas is recirculated from the third port 55 via the recirculation pipe 6A to the recirculation device 6.

In addition, though the best configurations, methods, and the like for carrying out the present invention are disclosed in the above description, the present invention is not limited to this. That is, the present invention is mainly illustrated and described with respect to a specific implementation, it is to be understood that various modifications to the shape, material, quantity, other detailed configurations can be made by those skilled in the art with respect to the above-described embodiments without departing from the spirit and scope of the present invention. Therefore, the description that limits the shape and material disclosed above is illustratively described in order to facilitate the understanding of the present invention, but does not limit the present invention, and therefore the description in the name of the member with a part removed from a part of limitations or the entire limitation on the shape, material, etc. thereof is included in the present invention.

REFERENCE SIGNS LIST

1 gas pressure feed device
2 compression device
3 cooling device
4 shut off device
5 surge prevention device
6 recirculation device
10 three-way valve
11 first port
12 second port
13 third port
14 switching device
15 valve main framework
16 valve port
17 actuator (driving device)
21 first communication part
22 second communication portion
23 gas circulation portion

The invention claimed is:

1. A gas pressure feed device comprising:
a compression device for compressing gas supplied from an upstream process and sending the gas to a downstream process;
a shut off device provided downstream from the compression device for shutting off the gas heading toward the downstream process; and
a recirculation device for recirculating the gas shut off by the shut off device to the upstream process of the compression device, wherein
the shut off device includes
a first port on a primary side for introducing the gas from the compression device,
a second port on a secondary side for sending the gas to the downstream process,
a third port on the secondary side for sending the gas to the recirculation device, and
a switching device for switching the gas heading toward the secondary side to either the second port or the third port, wherein
the shut off device comprises a three-way valve having a case-shaped valve main framework, a valve port ("inner port") supported such that a secondary side thereof is movable between positions of the second port and the third port in the valve main framework, and a driving device for driving the valve port ("inner port"),
the valve port is provided with a first communication portion communicable with the first port, a second communication portion communicable with at least one of the second port and the third port, and a gas flow portion for allowing gas to flow from the first communication portion to the second communication portion, and wherein
the gas flow portion decreases in diameter from the first communication portion to a middle position where a cross sectional area of the gas flow passage is equal to or greater than an opening area of a flow passage at the first port, and the diameter of the gas flow portion increases in diameter from the middle position and toward the second communication portion, and wherein the diameter of the gas flow diameter changes continuously and smoothly from the first communication portion to the second communication portion.

2. The gas pressure feed device according to claim 1, wherein in an intermediate stage of switching by the switching device, the shut off device continues to send the gas toward at least one of the second port and the third port.

3. The gas pressure feed device according to claim 2, wherein the valve main framework is provided with the first port, the second port, and the third port, wherein the switching device is constituted by the valve port ("inner port") and the driving device and wherein movement of the valve port ("inner port") by the driving device switches between a first position in which the first communication portion communicates with the first port and the second communication portion communicates with the second port and a second position in which the first communication portion communicates with the first port and the second communication portion transports with the third port.

4. The gas pressure feed device according to claim 3, wherein the valve port ("inner port") is formed in a spherical shape and a secondary side thereof is rotationally supported between the positions of the second port and the third port in the valve main framework, wherein the first communication portion and the second communication portion are positioned oppositely in a radial direction of the valve port, and the gas flow portion is formed passing through the valve port ("inner port"), wherein the first communication portion has an opening area enveloping the first port in a movement range caused by rotation of the valve port ("inner port"), and wherein the second communication portion is configured to have an opening area in which a total of a cross sectional area of a flow passage at the second port and a cross sectional area of a flow passage at the third port during switching between the first position and the second position caused by the rotation of the valve port ("inner port") is equal more than half of a cross sectional area of a flow passage at the first port.

5. The gas pressure feed device according to claim 1, wherein the valve main framework is provided with the first port, the second port, and the third port, wherein the switching device is constituted by the valve port ("inner port") and the driving device and wherein movement of the valve port ("inner port") by the driving device switches between a first position in which the first communication portion communicates with the first port and the second communication portion communicates with the second port and a second position in which the first communication portion communicates with the first port and the second communication portion transports with the third port.

6. The gas pressure feed device according to claim 5, wherein the valve port ("inner port") is formed in a spherical shape and a secondary side thereof is rotationally supported between the positions of the second port and the third port in the valve main framework, wherein the first communication portion and the second communication portion are positioned oppositely in a radial direction of the valve port, and the gas flow portion is formed passing through the valve port ("inner port"), wherein the first communication portion has an opening area enveloping the first port in a movement range caused by rotation of the valve port ("inner port"), and wherein the second communication portion is configured to have an opening area in which a cross sectional area of a flow passage at the second port and a cross sectional area of a flow passage at the third port during switching between the first position and the second position caused by the rotation of the valve port ("inner port") is equal to more than half a cross sectional area of a flow passage at the first port.

* * * * *